Patented Dec. 4, 1928.

UNITED STATES PATENT OFFICE.

1,693,666

EARL B. PUTT, OF NEW YORK, N. Y.

FINELY-DIVIDED PHENOLPHTHALEIN AND PROCESS OF MAKING SAME.

No Drawing.   Application filed May 11, 1926.   Serial No. 108,418.

This invention appertains to phenolphthalein and processes of making the same, and more particularly to a finely divided phenolphthalein or to phenolphthalein in a colloidal form.

In my prior patent No. 1,574,934, issued to me March 2, 1926, I illustrated a bulky, quickly soluble form of phenolphthalein and processes of making the same, and this invention relates to an improvement and addition to said patent.

An object of the present invention is to produce phenolphthalein in a colloidal form or in a crystalline condition even more finely divided than in the amorphous product described in my patent above referred to, by precipitating phenolphthalein from solution under carefully regulated conditions.

The usual method of producing a finely crystallized phenolphthalein is by the well known procedure of rapid deposition from a saturated solution in certain organic solvents such as alcohol, acetone, amyl alcohol, etc., either by evaporation, supersaturation, or dilution with a liquid in which the phenolphthalein is comparatively insoluble such as benzol or water. Such crystals, though fine enough to pass through even a three hundred mesh sieve in some cases, are still very large as compared with material yielded by my process. For example, such a three hundred mesh crystal has a diameter of about 80 microns when viewed through the microscope, whereas my new product shows particles having a diameter averaging 6 microns for the crystalline and of sub-microscopic size of the colloidal particles.

For the production of the finely divided crystalline form the following procedure is a typical illustration of my process:

100 grams of phenolphthalein is dissolved in 200 cc. of water containing 50 cc. of 50 per cent sodium hydroxide solution, keeping the mixture cooled by suitable means to 20° C. After the solution is complete it is diluted with 2000 cc. of water containing in solution 100 grams of acacia (gum arabic) or other gum such as Indian gum, tragacanth or agar-agar, in an amount which yields a solution or suspension having the viscosity of the 5 per cent acacia solution mentioned. To this solution, after filtration if necessary, add an excess of 50 per cent acetic acid, rapidly and with vigorous stirring. As the alkaline phenolphthalein solution is neutralized, the red color disappears, but if the addition of the acetic acid has been properly regulated, there is a distinct time interval before the phenolphthalein starts to precipitate, even though the solution is quite acid. The liquid is clear for as much as several seconds, when suddenly the phenolphthalein separates out from solution in a dense white precipitate, which when viewed under the microscope is very finely divided and minutely crystalline. Allow the mixture to stand over night, filter, wash with water until free from impurities, and dry in the usual manner. The novelty in this reaction lies in the formation of a colloidal solution of phenolphthalein from which minute crystals form on standing. The amount of protective colloid, in this instance gum, is not sufficient to yield a permanent colloidal solution but is enough to retard precipitation until crystallization can take place. The use of a considerable excess of acetic acid, rapidly added in concentrated form aids in the formation of this colloidal phase. Also the addition of the yellow by-products in the manufacture of phenolphthalein act as protectives and yield a more finely divided phenolphthalein than if the latter is precipitated pure with acetic acid alone.

A stream of carbon dioxide may be substituted for the acetic acid if the action is carried on rapidly.

For the manufacture of colloidal phenolphthalein, the same procedure of preparation of phenolphthalein solution is followed, as also the precipitation. But instead of using only the equivalent of a 5 per cent acacia solution, use a gum solution or suspension of such strength that on standing at room temperature a stiff cream or gel is formed. For example, a solution or suspension of 0.25 to 0.50 grams agar-agar in 100 cc. of water may be employed as the diluent of the alkali solution. On precipitation of the phenolphthalein with a weak acid, e. g., acetic or carbonic, the phenolphthalein remains dispersed in colloidal form in the gel of protective colloid. Under the microscope the phenolphthalein particles are in size from 3 microns to submicroscopic in size. The same effect may be produced by the addition of a solution of phenolphthalein in an organic solvent such as alcohol, to the agar solution without emulsification.

Having prepared a white, pure phenolphthalein, I have found that if to the same alkali solution be added a solution of the yellow impurities or by-products normally found in yellow phenolphthalein and precipitated with the phenolphthalein when acid is added thereto the particles will be rendered smaller than if the pure white material is precipitated alone. It is therefore possible to prepare separately and to purify such derivatives of phenolphthalein and then to precipitate these in known amounts with pure phenolphthalein to secure a product with an increased laxative effect. Such derivatives of phenolphthalein, may or may not be yellow, but must be soluble in alkali of the same strength as that which dissolves phenolphthalein. They may be obtained purely as by-products in the manufacture of phenolphthalein, or as a result of direct manufacture.

By the term "gel-forming material" as employed herein I mean a material which forms a gel with water or dilute alkali solutions in water at a temperature of approximately 25° C.

While I have described in detail the preferred practice of my process, it is to be understood that the details of procedure may be widely varied without departing from the spirit of the invention or the scope of the subjoined claims.

I claim:

1. A finely divided phenolphthalein made up of unground particles less than 10 microns in diameter.

2. A colloidal suspension of phenolphthalein in the form of particles of less than 10 microns in diameter.

3. The herein described process of preparing colloidal phenolphthalein which comprises precipitating a solution of phenolphthalein having mixed therewith a gel-forming material in an amount sufficient to form a thick gel on standing.

4. The herein described process of preparing colloidal phenolphthalein which comprises precipitating a solution of phenolphthalein having mixed therewith an aqueous solution of acacia in an amount sufficient to form a thick gel on standing.

5. The herein described process of preparing colloidal phenolphthalein which comprises treating an alkaline solution of phenolphthalein with an acid in the presence of an amount of a protective colloid sufficient to prevent instant precipitation.

6. The herein described process of preparing colloidal phenolphthalein which comprises treating an alkaline solution of phenolphthalein with acetic acid in the presence of an amount of a protective colloid sufficient to prevent instant precipitation.

7. The herein described process of preparing colloidal phenolphthalein which comprises treating an alkaline solution of phenolphthalein with an excess of acetic acid in the presence of an amount of a protective colloid sufficient to prevent instant precipitation.

8. The herein described process which comprises forming an alkaline solution of phenolphthalein, mixing water containing a solution of a protective colloid therewith while cool, adding an acid thereto, and stirring the solution during the addition of the acid to precipitate the phenolphthalein.

9. The herein described process which comprises preparing an alkaline solution of phenolphthalein, mixing a solution of a gel-forming material therewith while cool, and adding an acid thereto.

10. The herein described process which comprises dissolving phenolphthalein in an aqueous solution of sodium hydroxid, mixing therewith while cool an aqueous solution of acacia in an amount sufficient to form a thick gel on standing, and adding an acid thereto.

In testimony whereof I affix my signature.

EARL B. PUTT.